Sept. 17, 1963  N. C. LUDWIG  3,103,817
APPARATUS FOR MEASURING KILN TEMPERATURES
Filed Aug. 12, 1960  2 Sheets-Sheet 1
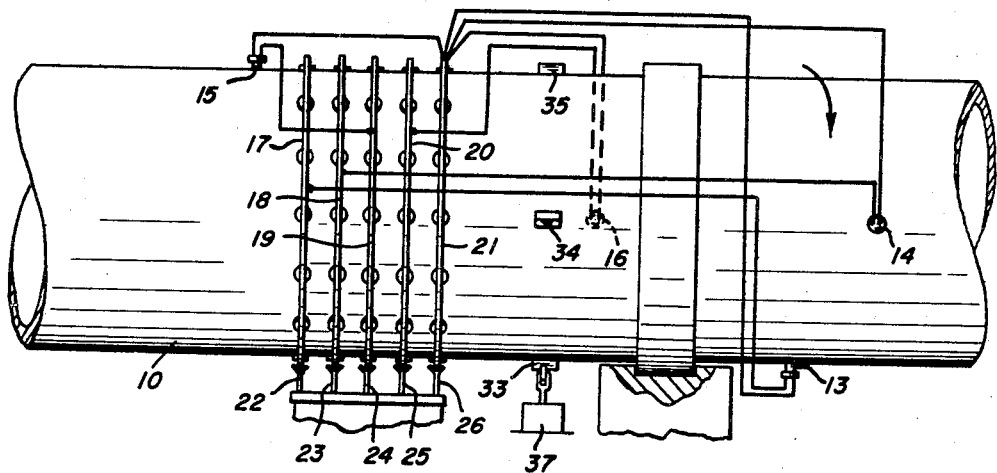
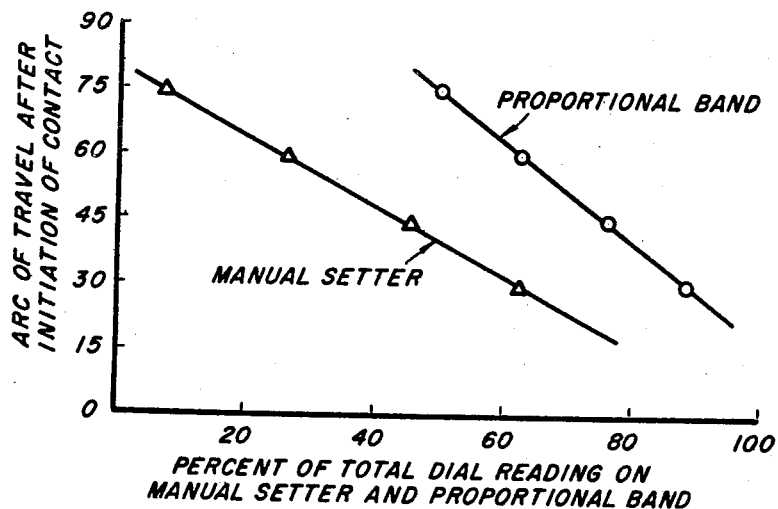
INVENTOR
NORMAN C. LUDWIG
By Donald G. Dalton
Attorney

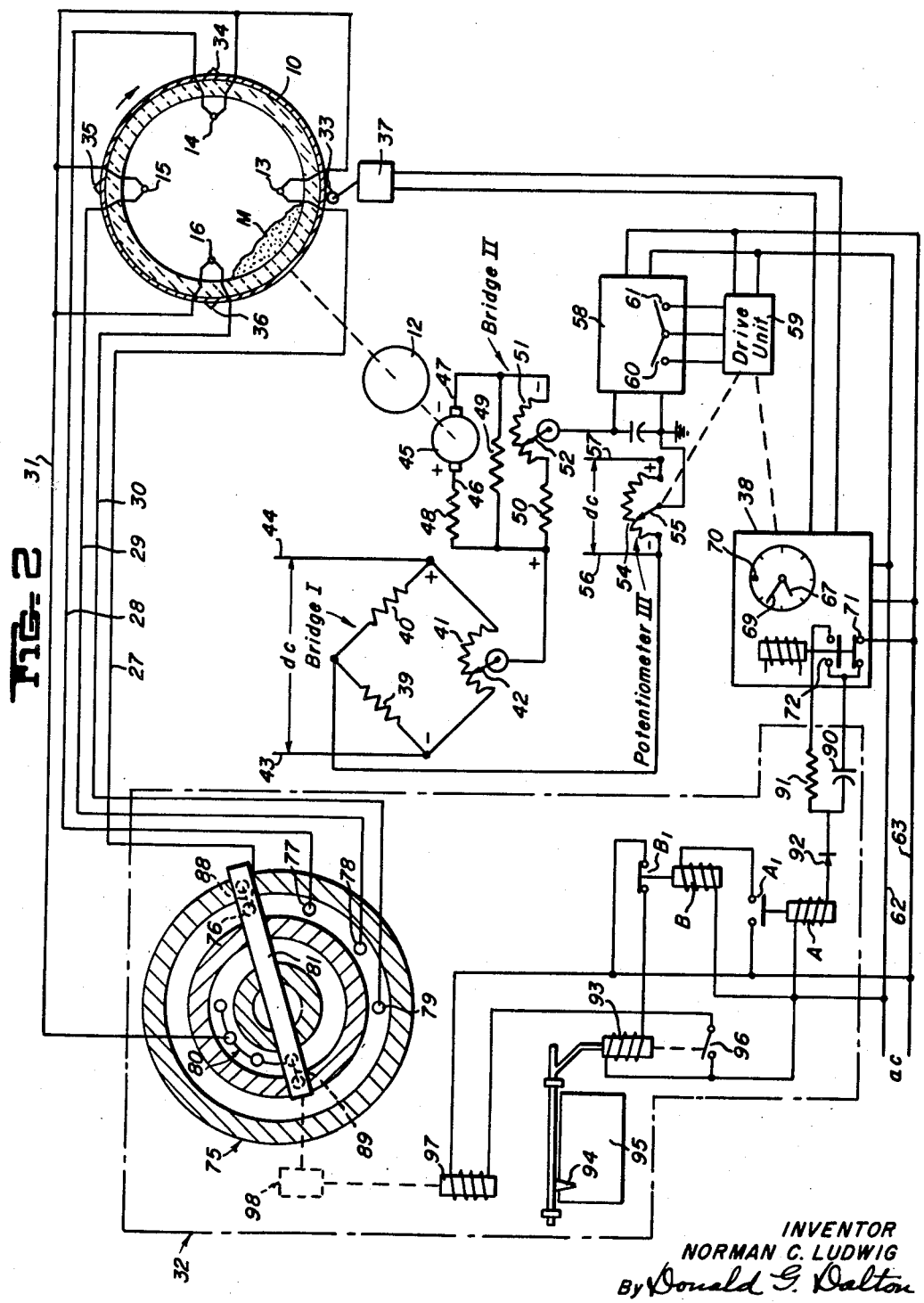

United States Patent Office 3,103,817
Patented Sept. 17, 1963

3,103,817
APPARATUS FOR MEASURING KILN
TEMPERATURES
Norman C. Ludwig, Chicago, Ill., assignor to United
States Steel Corporation, a corporation of New Jersey
Filed Aug. 12, 1960, Ser. No. 49,370
5 Claims. (Cl. 73—341)

This invention relates to an improved apparatus for measuring and recording temperatures in a rotary kiln.

An object of the invention is to provide an improved apparatus which automatically measures and maintains a record of the load temperatures at a plurality of locations spaced along the length of a kiln.

A further object is to provide an improved apparatus which facilitates adjustment in the angular relation of a temperature sensing element with respect to a kiln load at the moment the temperature is recorded.

A more specific object is to provide an improved temperature measuring and recording apparatus which includes a plurality of thermocouples spaced lengthwise along a kiln, a single potentiometric recorder adapted to be connected successively to the different thermocouples, and an adjustable control circuit for operating the recorder only when each thermocouple bears a predetermined but adjustable angular position in relation to the load.

In accomplishing these and other objects of the invention, I have provided improved details of structure, a preferred form of which is shown in the accompanying drawings, in which:

FIGURE 1 is a diagrammatic side elevational view of a portion of a rotary kiln equipped with a temperature measuring apparatus in accordance with my invention;

FIGURE 2 is a schematic wiring diagram of my control circuit omitting conventional details of the timer and recorder; and FIGURE 3 is a typical set of calibration curves used in adjusting the circuit shown in FIGURE 2.

FIGURES 1 and 2 show diagrammatically a portion of a conventional rotary kiln 10 which contains a load of fused material M, for example cement clinker. A drive motor 12 continuously rotates the kiln in a clockwise direction as viewed in FIGURE 2. I mount a plurality of thermocouples 13, 14, 15 and 16 immediately inside the kiln wall spaced lengthwise of the kiln according to any desired pattern (FIGURE 1) and equally spaced around its circumference (FIGURE 2). As shown in FIGURE 1, one terminal of each thermocouple is electrically connected to a respective collector ring 17, 18, 19 or 20. The other terminal of each is electrically connected to a common collector ring 21. The collector rings are mounted on the outside of the kiln and are electrically insulated from it. Respective stationary contact arms 22, 23, 24, 25 and 26 engage the collector rings and are electrically connected via conductors 27, 28, 29, 30 and 31 to potentiometric recorder 32, hereinafter described in more detail.

The exterior of the kiln also carries actuator shoes 33, 34, 35 and 36 located in a common cross-sectional plane (FIGURE 1) and in the radial planes of thermocouples 13, 14, 15 and 16 respectively (FIGURE 2). A kiln switch 37 is mounted directly under the bottom of the kiln in a position to be actuated successively by the different shoes 33, 34, 35 and 36. Each time a shoe actuates the kiln switch, my control circuit, hereinafter described, starts a timer 38. When the timer times out, the recorder 32 prints the temperature measured at that instant by the corresponding thermocouple. When the load M overlies any one of the thermocouples, this thermocouple measures the load temperature; otherwise it measures only gas or flame temperature. As the kiln rotates, it carries each thermocouple in succession to a position where the load overlies it. However, rotation of the kiln piles up the load somewhat past bottom, as shown in FIGURE 2. Hence, after the shoe 33, 34, 35 or 36 actuates the kiln switch 37, I delay the temperature measurement until the thermocouple rotates through a predetermined arc past the bottom of the kiln. Timer 38 automatically delays recording of the measurement until the thermocouple rotates through any desired arc past bottom and my control circuit automatically adjusts the timer to compensate for variations in kiln speed.

*Control Circuit*

As shown in FIGURE 2, my control circuit includes a first bridge I formed of two fixed resistances 39 and 40, a variable resistance 41, and a "manual setter" contact arm 42 which engages the latter resistance. This bridge is connected to a D.-C. source which includes negative and positive lines 43 and 44. The kiln drive motor 12 is mechanically connected to a D.-C. tachometer-generator 45, which has positive and negative output lines 46 and 47. A resistance 48 is connected in series with the tachometer-generator to serve as a voltage-dropping resistance. An auxiliary bridge II is formed by two fixed resistances 49 and 50 and a variable resistance 51. A manually adjustable "proportional band" contact arm 52 engages the last resistance. As shown by the plus and minus polarity signs, I interconnect the two bridges in a way that the voltages developed across them oppose each other. A resistance 54 together with a contact arm 55 form a potentiometer III which is energized from negative and positive lines 56 and 57. The two bridges I and II and the potentiometer III are connected in a series "loop," the terminals of which are connected to the inuput of an amplifier 58.

Initially I adjust the manual setter contact arm 42 to unbalance the first bridge sufficiently to provide a starting voltage. As the kiln rotates, the tachometer-generator 45 develops an opposing voltage proportionate to the kiln speed. Voltage may be impressed on the amplifier 58 in either direction, depending on the relative magnitude of the two voltages. The amplifier controls a mechanism which automatically adjusts the potentiometer arm 55 to a point where zero voltage is applied to the amplifier; that is, the adjustment is made so that the voltage of potentiometer III is equal and opposite to the vector sum of the voltages of bridges I and II. For this purpose the circuit includes a conventional reversible drive unit 59 which is mechanically connected to arm 55. Amplifier 58 includes reversing relays whose contacts are indicated at 60 and 61. When voltage is impressed on the amplifier, one or the other of these relays is energized, depending on the polarity of the voltage, and closes its contact 60 or 61. The drive unit and the amplifier are connected to A.-C. lines 62 and 63. When contact 60 or 61 closes, the drive unit is energized and moves arm 55 in a direction to maintain constantly a zero bridge voltage.

The drive unit 59 is also mechanically connected to an adjusting hand 67 of timer 38, which also is energized from lines 62 and 63. When the drive unit adjusts the potentiometer arm 55, it also adjusts the timer hand 67. The position of this hand determines the length of delay after the kiln switch 37 is actuated before recorder 32 registers the kiln temperature. I choose a suitable angular position which I wish the thermocouples 13, 14, 15 and 16 to reach before the recorder acts, for example 30° past bottom. As hereinafter explained, I adjust the manual setter arm 42 and the proportional band arm 52 to settings for this angle. The duration of delay needed for the thermocouple to reach this angle of course depends on the kiln speed, but the control circuit automatically compensates for any speed variations, since for any change in kiln speed the voltage output of the tachometer-generator 45 changes a proportionate amount. For a given moment the burner man may have increased kiln speed. The tachometer-generator voltage now exceeds the voltage developed across the first bridge I, whereupon voltage is impressed on amplifier 58. Contacts 60 close and the drive unit 59 operates in a direction to move the potentiometer arm 55 clockwise and thus increase the voltage from potentiometer III. The timer hand 67 likewise moves in a clockwise direction to shorten the time delay. The reverse of this action occurs if the kiln speed is decreased.

The timer 38 can be of conventional construction available commercially and hence is not shown in detail. Nevertheless reference can be made to a printed publication by Eagle Signal Corporation, Moline, Illinois, Bulletin 120, August 1955, entitled "Cycl-Flex Reset Timer," for a description of one suitable form of timer. This timer has another hand 69 which moves between the first hand 67 and a fixed stop 70. Normally the hand 69 is in its reset position overlying hand 67. The timer is electrically connected to the kiln switch 37. When one of the actuator shoes 33, 34, 35 or 36 actuates the kiln switch, the timer commences to time out, and its hand 69 moves from the overlapped position to the stop 70. The timer contains a normally closed contact 71 and a normally open contact 72. When it times out, the positions of the contacts momentarily reverse, as hereinafter explained, to complete a circuit which causes the recorder to print and switch to the next thermocouple. After the timer times out, it promptly resets automatically, whereupon the recorder registers the temperature.

*Recorder*

As shown in FIGURE 2, my recorder 32 includes a conventional rotary switch 75 which has stationary outer contact buttons 76, 77, 78 and 79, stationary inner contact buttons 80, and a rotatable element 81. The contact buttons are located under the rotatable element. Each time the recorder acts, the rotatable element turns a fractional revolution to overlie the next succeeding contact buttons, as known in the art. Conductors 27, 28, 29 and 30 are connected to the outer contact buttons 76, 77, 78 and 79, respectively. As already explained, these conductors lead to one terminal of the thermocouples 13, 14, 15 and 16 respectively through the contact arms and collector rings. Conductor 31 is connected to the inner contact buttons 80, which are themselves connected together in series. As already explained, conductor 31 leads to the other terminal of each thermocouple. The rotatable element 81 carries contact brushes 88 and 89 which ride over the outer and inner contact buttons. These brushes make electrical contact with whichever buttons they are overlying. The two brushes 88 and 89 are electrically connected to the conventional measuring circuit of a pontentiometric recorder, not shown.

The recorder contains a condenser 90 and a resistance 91 (for example 200 ohms) connected in series with the timer contact 72 and thence to line 63 through contact 71. One end of the coil of a relay A is connected through a rectifier 92 to a point between condenser 90 and resistance 91, which furnish a current path to line 63. The other end of the coil of relay A is connected to line 62. Normally no current flows through the relay coil, since one of the possible current paths therethrough is interrupted by the open contact 72 and the other by the condenser 90 and rectifier 92. When timer 38 times out, contact 71 opens momentarily to disconnect condenser 90, rectifier 92 and relay coil A from line 63. Then contact 72 closes momentarily to discharge condenser 90 through resistance 91. Contact 71 closes when the timer resets. A current pulse passes through contacts 71, condenser 90, rectifier 92, and the coil of relay A, whereupon the relay is energized momentarily and closes its normally open contact $A_1$.

Contact $A_1$ is connected in series with the coil of a relay B, which has a normally closed contact $B_1$, and the A.-C. lines 62 and 63. When contact $A_1$ closes momentarily, relay coil B is energized momentarily and causes its contact $B_1$ to open. A "print" solenoid 93 is connected across lines 62 and 63 in series with contact $B_1$, and thus normally is energized. This solenoid actuates a shaft in the recorder that holds a printing pen 94. When contact $B_1$ momentarily opens, the print solenoid momentarily is deenergized, whereupon pen 94 records a temperature on a chart 95. This temperature is that sensed by whichever thermocouple is connected to brush 88, in the illustration thermocouple 13.

The "print" solenoid 93 also is mechanically connected to an interrupter switch 96, which remains open as long as the solenoid is energized. This switch is connected across lines 62 and 63 in series with the coil of an "advance" solenoid 97. This solenoid advances rotatable element 81 one step through a conventional gear and ratchet mechanism 98. When the "print" solenoid is momentarily deenergized, switch 96 closes, whereupon the "advance" solenoid advances arm 81 to the next position. The recorder balances on this point until it receives a new signal from the timer and then the process is repeated.

*Calibration*

FIGURE 3 shows a typical set of curves which I use to adjust the "manual setter" contact arm 42 and the "proportional band" contact arm 52. As already mentioned, the duration of the interval, after the kiln switch 37 is actuated before the recorder 32 prints is of a magnitude that the kiln turns through a predetermined arc. I control this arc by adjusting both arms 42 and 52, which have settings corresponding with each arc. In a typical installation, the "manual setter" arm 42 is adjusted in accordance with the lower curve of FIGURE 3, and the "proportional band" arm 52 in accordance with the upper curve. In each instance the ordinates represent the arc, and the abscissae the percent of the total scale reading. These settings of course vary with the values of the different resistances and are determined empirically for any particular installation.

From the foregoing description it is seen that my invention provides an apparatus which automatically maintains a record of the temperatures as read by thermocouples or other sensing elements at a plurality of points along the length of a rotary kiln. The apparatus measures load temperatures rather than gas or flame temperature, and it assures that the load fully overlies the temperature sensing elements when measurements are taken. At the same time the angular relation of the temperature sensing elements to the load at the moment the temperature is recorded is readily adjusted.

While I have shown and described only a single embodiment of my invention, it is apparent that modifications may arise. Therefore, I do not wish to be limited to the disclosure set forth but only by the scope of the appended claims.

I claim:

1. The combination, with a rotary kiln adapted to contain a load which piles up past the bottom as the kiln rotates, of a temperature measuring apparatus comprising a plurality of temperature sensing elements mounted inside the kiln wall and spaced both lengthwise of the kiln and around its circumference, a recorder adapted to be connected successively to each of said elements for recording the temperature sensed by each in turn, means actuated by said kiln for operating said recorder when rotation of the kiln moves each element through a predetermined arc past bottom to assure that the load overlies the respective element, and means operatively connected with said kiln and with said operating means for automatically adjusting the latter in accordance with the speed of rotation of said kiln to maintain the same arc despite variations in kiln speed.

2. The combination, with a rotary kiln adapted to contain a load which piles up past the bottom as the kiln rotates, of a temperature measuring apparatus comprising a plurality of temperature sensing elements mounted inside the kiln wall and spaced both lengthwise of the kiln and around its circumference, a recorder adapted to be connected successively to each of said elements for recording the temperature sensed by each in turn, a switch located directly under the bottom of said kiln for initiating operation of said recorder, actuating means for said switch, said actuating means being located on the outside of said kiln in the same radial planes as said elements, means for delaying operation of said recorder following each actuation of said switch until the kiln rotates through a predetermined arc to assure that the load overlies the respective element, and means operatively connected with said kiln and with said delaying means for automatically adjusting the latter in accordance with speed of rotation of the kiln to maintain the same arc despite variations in kiln speed.

3. The combination, with a rotary kiln adapted to contain a load which piles up past the bottom as the kiln rotates, of a temperature measuring apparatus comprising a plurality of temperature sensing elements mounted inside the kiln wall and spaced both lengthwise of the kiln and around its circumference, a recorder adapted to be connected successively to each of said elements for recording the temperature sensed by each in turn, a switch located directly under the bottom of said kiln, actuating means for said switch, said actuating means being located on the outside of said kiln in the same radial planes as said elements, an electric control circuit connecting said switch and said recorder for operating the recorder on actuation of the switch, said circuit including adjustable means for delaying operation of said recorder following each actuation of said switch until the kiln rotates through a predetermined arc to assure that the load overlies the respective element, and means operatively connected with said kiln and with said delaying means for auotmatically adjusting the latter in accordance with the speed of rotation of the kiln to maintain the same arc despite variations in kiln speed.

4. The combination, with a rotary kiln adapted to contain a load which piles up past the bottom as the kiln rotates, of a temperature measuring apparatus comprising a plurality of temperature sensing elements mounted inside the kiln wall and spaced lengthwise of the kiln and equally around its circumference, a recorder adapted to be connected successively to each of said elements for recording the temperature sensed by each in turn, a switch located directly under the bottom of said kiln, actuating means for said switch, said actuating means being located on the outside of said kiln in the same radial planes as said elements, and an electric control circuit connecting said switch and said recorder for operating the recorder on actuation of the switch, said circuit including an adjustable timer for delaying operation of said recorder following actuation of the switch, and means for automatically adjusting said timer in accordance with the kiln speed to operate the recorder when rotation of the kiln moves each element through a predetermined arc past bottom to assure that the load overlies the respective element.

5. The combination, with a rotary kiln adapted to contain a load which piles up past the bottom as the kiln rotates, of a temperature measuring apparatus comprising a plurality of temperature sensing elements mounted inside the kiln wall and spaced lengthwise of the kiln and equally around its circumference, a recorder having a rotary switch for connecting it successively to each of said elements for recording the temperature sensed by each in turn, a kiln switch located directly under the bottom of said kiln, actuating means for said kiln switch, said actuating means being located on the outside of said kiln in the same radial planes as said elements, and an electric control circuit connecting said kiln switch and said recorder for operating the recorder on actuation of the kiln switch, said circuit including an adjustable timer for delaying operation of said recorder following actuation of the kiln switch, means for automatically adjusting said timer in accordance with the kiln speed to operate the recorder when rotation of the kiln moves each element through a predetermined arc past bottom to assure that the load overlies the respective element, and means for adjusting the magnitude of said arc.

References Cited in the file of this patent

UNITED STATES PATENTS

| | | |
|---|---|---|
| 2,109,396 | McCoy | Feb. 22, 1938 |
| 2,303,843 | Knoblanch | Dec. 1, 1942 |
| 2,428,129 | Smith | Sept. 30, 1947 |
| 2,907,209 | Woch | Oct. 6, 1959 |